United States Patent
Acker et al.

(10) Patent No.: US 12,241,580 B2
(45) Date of Patent: Mar. 4, 2025

(54) TOOL FOR INTERVENTION ON THE WALL OF A FLUID PIPE, WITH MOTORIZED ROLLERS

(71) Applicant: GRTGAZ, Bois-Colombes (FR)

(72) Inventors: Benoit Acker, Bondues (FR); Charles Fernandez, Saint-Chamond (FR); Melissandre Bonnaudet, Mongeron (FR); Maxime Lecchi, Sartrouville (FR); Eric Courtalon, Compiegne (FR)

(73) Assignee: GRTGAZ, Bois-Colombes (FR)

( * ) Notice: Subject to any disclaimer, the term of this patent is extended or adjusted under 35 U.S.C. 154(b) by 458 days.

(21) Appl. No.: 17/291,330

(22) PCT Filed: Nov. 6, 2019

(86) PCT No.: PCT/FR2019/052626
§ 371 (c)(1),
(2) Date: May 5, 2021

(87) PCT Pub. No.: WO2020/094975
PCT Pub. Date: May 14, 2020

(65) Prior Publication Data
US 2022/0026009 A1    Jan. 27, 2022

(30) Foreign Application Priority Data
Nov. 6, 2018  (FR) .................................. 18 60216

(51) Int. Cl.
*F16L 55/32* (2006.01)
*F16L 55/48* (2006.01)
(Continued)

(52) U.S. Cl.
CPC .............. *F16L 55/32* (2013.01); *F16L 55/48* (2013.01); *G05D 1/0259* (2013.01);
(Continued)

(58) Field of Classification Search
CPC ......... F16L 55/32; F16L 55/48; F16L 2101/30; G05D 1/0259; G05D 1/0272; G05D 1/0278
(Continued)

(56) References Cited

U.S. PATENT DOCUMENTS 3,834,422 A * 9/1974 Larson .............. F16L 55/16455
138/93
3,946,761 A * 3/1976 Thompson ........ F16L 55/16455
138/93
(Continued)

FOREIGN PATENT DOCUMENTS

FR    2498730 A1    7/1982
FR    3016952 A1    7/2015
(Continued)

OTHER PUBLICATIONS

English language abstract of FR2498730.

*Primary Examiner* — David R Deal
(74) *Attorney, Agent, or Firm* — Workman Nydegger (57) ABSTRACT

A tool for intervention on the wall of a fluid pipe, includes a duct segment through which the fluid is intended to flow when the tool is in the pipe, and at least first and second modules for creating seals between the wall of the pipe and the duct segment, to isolate the fluid circulating in an outer part of a section of the pipe, between the first and second seal creation modules. The tool includes motorized rollers for moving the tool in the pipe and a module for determining the location of the tool in the pipe.

18 Claims, 5 Drawing Sheets

(51) Int. Cl.
    *G05D 1/00*     (2024.01)
    *F16L 101/30*     (2006.01)

(52) U.S. Cl.
    CPC ......... *G05D 1/0272* (2013.01); *G05D 1/0278* (2013.01); *F16L 2101/30* (2013.01)

(58) Field of Classification Search
    USPC ...................................................... 138/97, 98
    See application file for complete search history.

(56) References Cited

U.S. PATENT DOCUMENTS

| | | | | |
|---|---|---|---|---|
| 4,303,103 | A | * | 12/1981 | Marks ................... F16L 55/163 |
| | | | | 29/402.09 |
| 4,413,655 | A | * | 11/1983 | Brown .................. F16L 55/163 |
| | | | | 138/93 |
| 4,646,787 | A | * | 3/1987 | Rush ..................... G01M 3/005 |
| | | | | 73/866.5 |
| 4,769,598 | A | * | 9/1988 | Krieg ................. G01N 29/2412 |
| | | | | 324/226 |
| 4,861,248 | A | * | 8/1989 | Ben ................... F16L 55/16455 |
| | | | | 425/13 |
| 6,098,231 | A | * | 8/2000 | Smith ..................... F16L 55/38 |
| | | | | 15/104.061 |
| 6,752,175 | B1 | | 6/2004 | Willschuetz |
| 10,215,323 | B2 | | 2/2019 | Engie |
| 2005/0223825 | A1 | | 10/2005 | Janssen |
| 2007/0286682 | A1 | * | 12/2007 | Freyer ..................... F16L 55/48 |
| | | | | 405/184.1 |

FOREIGN PATENT DOCUMENTS

| | | |
|---|---|---|
| WO | 86/01751 A1 | 3/1986 |
| WO | 03/067134 A2 | 8/2003 |
| WO | 2007/141554 A1 | 12/2007 |

\* cited by examiner

TOOL FOR INTERVENTION ON THE WALL OF A FLUID PIPE, WITH MOTORIZED ROLLERS

TECHNICAL FIELD

The disclosure relates to the field of tools and method for intervention on the walls of pipes for fluid transport, such as hydrocarbons in the liquid or gaseous state, or pipes for water transport.

Generally, the fluid (liquid or gas) is under pressure during the operation of the network of which the pipe is part. More particularly, the intervention has as its object the repair of the pipe, or the welding of elements applied to the pipe.

The pipes in question can run in the open or be buried pipes, or submarine pipes. Their walls can have, in the course of the operation which must last many years, faults due to corrosion or mechanical attack phenomena, which must be repaired. The walls of the pipes can also have manufacturing defects. Sometimes, tapping may have occurred on the pipes for fraudulent reasons, and it is also necessary to intervene on the pipe and withdraw the tap and repair the wall of the pipe.

The repair must generally be carried out by depressurizing a section of the pipe flanking the fault to be repaired, while maintaining the transit of fluid, because any interruption would have serious economic consequences for the operator of the pipe or of the network The repair may be carried out after removal of the fluid from the section flanking the fault (removal of gas or of liquid, for example).

In the same manner, when it is desired to carry out a weld on the outside wall of the pipe, it is sometimes necessary to cut the circulation of the fluid in the section in question, particularly to avoid excessive cooling of the material, harmful to the quality of the weld and to its durability over time.

Depressurizing and fluid removal systems that are complex to use and expensive are known, such as loaded shutters and their associated accessories (reinforcing saddle, boring under load, balloons). Also known are temporary loops for maintaining transit, complex in their structure and also complex to handle due to the fact of their implications in terms of safety for the operators.

Also known is document WO2007141554 which discloses a device particularly allowing plugging a fault by introducing an internal duct into the pipe, the internal duct being positioned facing the fault and an expansible component positioned around the duct being activated so as to inflate to block the fault from the inside. One variant of the device is also used to place a valve in the pipe.

This device involves leaving a bulky tool in place in the pipe, and is therefore unsatisfactory because the pipe remains partially blocked after intervention.

Also known is document WO03/067134 which discloses a device for cutting off (blocking) the circulation of fluid in a pipe at high pressure. The use of this device involve the circulation of fluid being diverted or interrupted, which is not satisfactory.

Finally, document FR3016952 describes a tool for intervention on the wall of a pipe which is equipped with a duct segment through which the fluid can continue to flow. This being the case, there exists a need to further improve this tool, in particular as regards its placement relative to the location of the pipe on which it is desired to intervene.

SUMMARY

The disclosure proposes in this context a tool for intervention on the wall of a fluid pipe, comprising a duct segment through which the fluid is intended to flow when the tool is in the pipe, and at least first and second modules for creating seals between the wall of the pipe and the duct segment, to isolate the fluid circulating in an outer part of a section of the pipe, between the first and second seal creation modules.

According to a general feature, the tool includes motorized rollers for moving the tool in the pipe and a module for determining the location of the tool in the pipe.

By means of a tool of this type, it is possible to create a sealed peripheral zone (a volume) in a section of the pipe, facing and in contact with the zone (the surface) of the wall on which it is desired to intervene. This zone is the outer part, between the duct segment, the first and second seal creation modules.

This sealed zone is isolated from the circulating fluid, which can be advantageous from a thermal standpoint from the perspective of an intervention of the welding type on the wall. But the sealed zone can also be subject, if necessary, to decompression or to dumping to carry out an intervention on the depressurized wall without the presence of the fluid, even as the fluid continues to flow through the duct segment. Thus, the tool allows the repair of a pipe (or another intervention) without interrupting the operation of the network, and also allow reducing the intervention time. The facility and the reliability of use make this tool particularly attractive relative to systems of the prior art discussed above. The absence of an external bypass system will also be noted, a system of this type being made useless by the presence of the duct segment internal to the tool.

It can be noted that in the duct segment, the fluid can flow once the device has reached its desired position, typically at the location where it is desired to intervene, for example for a repair. The duct segment can be configured to be made passing when that is necessary (for example during the intervention).

To reach the desired position of the tool in the pipe, the intervention point, both a module for determining the location of the tool in the pipe, to know in particular the location of the tool relative to the intervention point, and the motorized rollers are used.

According to the present disclosure, the motorized rollers can not only ensure the retention of the tool in the pipe, and allow obtaining an accurate positioning of the tool in the pipe.

Thus it is not necessary to place a stop in the pipe at the position of the intervention point to stop the tool against the stop, because the motorized rollers can move the tool to the desired position by using information originating in the module for determining the location of the tool in the pipe. In fact, the motorized rollers can be activated by their motor to drive the tool by rolling on the wall, in order to move it.

As the localization module equips the tool directly, it is possible to have autonomous or quasi autonomous operation of the tool until the intervention point is reached.

The seal creation modules can each include at least one gasket actuatable in expansion or contraction, for example inflated with oil via an oil/nitrogen accumulator, or with expansion by compression via a system of movable flanges.

According to a preferred embodiment, the first and second seal creation modules are in two parts, defining seal airlocks between the two parts of said first or second seal creation modules. For example, two retractable gaskets actuatable in expansion are used for each seal creation module. Between each pair of seals is a seal airlock.

The airlocks defined by the two parts allow obtaining an improvement in safety, in particular for applications in which the pressures are high. Such is the case in particular for gas transport networks where pressures can reach 85 bars and, exceptionally, 200 bars. The safety offered by the tool is then reinforced, as well as the reliability of the intervention process.

According to a particular embodiment, the motorized rollers can move the tool in the pipe in two opposite directions.

This particular embodiment allows obtaining an even finer adjustment of the position of the tool in the pipe. In particular, it allows moving the tool counter-current relative to the fluid.

According to a particular embodiment, the tool includes an electrical energy storage module and/or a hydraulic energy storage module (by the use of liquid and/or gas).

This particular mode of implementation allows obtaining autonomous operation of the tool, which can activate the motorized rollers and the other active elements of the tool without connection to an external source of electrical or hydraulic energy (by external is meant external to the tool, for example remote).

A person skilled in the art will know how to dimension the electrical or hydraulic energy storage module depending on the application.

It can be noted that if the storage module is configured for storing electrical energy, this allows the use of a controller, comprising a process for example, which will control the different modules of the tool.

This particular embodiment also allows using both an electrical energy storage module jointly with a hydraulic energy storage module. For example, the electrical energy storage module can supply a controller while the hydraulic energy storage module can supply the motorized rollers or other actuatable elements.

According to a particular embodiment, the tool includes an energy generating module (electrical or hydraulic) comprising a propeller, and/or a turbine, and/or a roller, the module being able to generate hydraulic or electrical energy to be stored in said electrical energy storage module or in the hydraulic energy storage module.

This particular embodiment further improves the autonomy of the tool.

For example, if a roller is used, this roller can be one of said motorized rollers or a roller which is not motorized. It can recover energy by rolling against the wall of the pipe.

According to a particular embodiment, the tool comprises an adjustable propulsion module using the movement of the fluid to move the tool in the pipe.

What is meant by adjustable is that the propulsion module can have for example a first position in which the movement of the fluid does not move the tool or no more than in the absence of the propulsion module, and a second position in which the movement of the fluid propels the tool until it reaches the speed of the fluid due to an entrainment phenomenon.

The adjustable propulsion module can be used over great distances without consuming electrical or hydraulic energy (except during its adjustment into a state which uses the movement of the fluid). This can allow moving the tool over great distances, before using motorized rollers which allow more accurate positioning to be obtained.

In fact, the propulsion module can for example be activated for its adjustment and its control, by means of a hydraulic system fed by an oil/nitrogen accumulator, by means of an electromechanical system fed by batteries, or by means of a combination of these systems.

According to a particular embodiment, the adjustable propulsion module includes an adjustable flap or an adjustable diaphragm or grid.

According to a particular embodiment, the tool comprises at least one braking module.

According to one particular embodiment, the braking module includes at least one seal, or at least one runner, and a module for applying a pressure able to press the seal or the runner against the wall of the pipe. Thus, during a braking phase, the seal can be pressed against the wall of the pipe.

The seal of the braking module can be a seal of a seal creation module. Alternatively, the seal of the braking module can be seal distinct from the seal creation modules.

For a tool which includes a propulsion module and a seal, a braking phase may be triggered by adjusting the propulsion module so that propulsion ends and by pressing the seal against the wall of the pipe.

It can be noted that the braking module cannot be a part of said seal creation modules, although the presence and the use of the braking module improves sealing.

According to a particular embodiment, the braking module comprises two seals or two runners.

For example, the seals or the runners can be positioned respectively at opposite ends of the tool, for example at opposite ends of the duct segment.

It will be possible in particular to use an oil or nitrogen system to apply pressure to the seal(s).

According to a particular embodiment, the braking module comprises a module for motorizing at least one of said motorized rollers able to function as an energy generator by braking the tool during its movement in the pipe.

It can be noted that this generated energy, which can be electrical or hydraulic energy, can be stored in the electrical energy storage module or in the hydraulic energy storage module. This particular embodiment is particularly advantageous as regard the autonomy of the tool.

It is also possible not to store the generated energy. In this case, the energy is dissipated.

According to a particular embodiment, the braking module comprises at least one brake of a roller equipping the tool.

This roller can be one of said motorized rollers or a non-motorized roller which can be used, for example, solely for the purpose of braking or of guiding the object.

This roller brake can be drum, disk or runner brake.

According to a particular embodiment, the module for determining the location comprises a sub-module for receiving at least one remote signal. The remote signal is a so-called wireless signal, and on the basis of this signal or on the basis of information provided in this signal, the tool can know its position or at least its relative position (for example relative to the intervention point).

According to a particular embodiment, the sub-module for receiving at least one remote signal includes a magnetic sensor, for example a Hall-effect sensor.

For example, this magnetic sensor can measure a particular variation of the magnetic field that a controller of the tool can interpret as a signature. For example, this signature can indicate the distance to the intervention point.

The disclosure, however, is in no way limited to the reception of signals having a particular signature. The detection of any signal by the magnetic sensor can be used to indicate its position to the tool. For example, if a single signal is expected, the electromagnet which transmits this signal will be placed at a predefined distance from the intervention point. A magnet can also be used.

It will be noted that the use of the magnetic sensor can be associated with the use, outside the pipe, of one or more electromagnets placed by operators.

According to one particular embodiment, the module for determining the location also comprises a transmitter of an electromagnetic signal, the magnetic sensor then detecting a reflected signal.

When a fault is present on the wall of the pipe, the reflected electromagnetic signal can be affected by the presence on the pipe of an excess thickness of metallic material. The detection of a modified reflected signal supplies information regarding the location of the tool.

According to a particular embodiment, the method comprises a module for determining the speed of the tool based on the detection of at least two magnetic signals by the magnetic sensor.

This module for determining speed can be implemented by means of a controller (comprising for example a processor).

By detecting two signals, each for example having its own signature (although that is not obligatory), and having knowledge of a predefined distance between these two signals, it is possible to know its speed, in addition to the position of the tool.

An operator will then be caused to place electromagnets with the predefined distance outside the pipe.

According to a particular embodiment, the method comprises a module for triggering braking of the tool on the basis of the detection of a magnetic signal by the magnetic sensor.

This module for triggering braking can be implemented by means of a controller (comprising for example a processor).

This braking can be accomplished by the braking module, or by the motorized rollers (possibly after recovering energy), by the adjustment of the propulsion module, or by several of these modules in a coordinated manner.

According to a particular embodiment, the tool comprises a module for triggering a fine adjustment of the position of the tool on the basis of the detection of a magnetic signal by a magnetic sensor.

This module for triggering a fine adjustment of the position of the tool can be implemented by means of a controller (comprising for example a processor). What is meant by fine adjustment of position is a position adjustment implemented by the motorized rollers.

For example, a fine adjustment can move the tool over a distance of less than 1 meter, 50 centimeters, even 5 centimeters.

For example, an electromagnet with a particular signature can signal the proximity of the intervention point, and the fine adjustment can be obtained by use of the motorized rollers.

If a single electromagnet is used on the pipe, then it is not necessary to use one with a particular signature.

According to a particular embodiment, the sub-module for receiving at least one remote signal comprises a module for receiving geolocation information.

Note that it can be contemplated that the sub-module for receiving at least one remote signal comprises at the same time a module for receiving geolocation information and a magnetic sensor, the magnetic sensor allowing finer determination of the position. A person skilled in the art will know which type of signal can be used, depending on the application.

According to a particular embodiment, the module for determining the location comprises an odometer.

In the same manner, an odometer can be used for certain applications, with a module for receiving geolocation information or even with a magnetic sensor, or even with both.

According to a particular embodiment, the module for determining the location comprises an inertial unit.

According to a particular embodiment, the tool comprises a non-destructive testing module.

For example, an X-ray testing module can equip the tool.

According to a particular embodiment, the tool comprises a module for reducing the pressure of the fluid present in the outer part.

According to the present disclosure, by directly equipping the tool with a module for reducing the pressure of the fluid present in the outer part, it is not necessary to implement tapping of the wall of the pipe to reduce the pressure in the outer part (typically after the seal creation modules have created said seal).

The pressure reducing module may reduce the pressure until the fluid in the outer part is at a pressure equal to that of the outside of the pipe.

In prior art solutions, it is in fact necessary to perform tappings to implement a decompression, and that is not necessary if the tool itself performs the decompression, for example by evacuating at least partially the fluid present in the outer part.

It can be noted that to cause the pressure to drop, the fluid can be partially evacuated toward the duct segment where the fluid flows, or to a reservoir.

According to a particular embodiment, the pressure reducing module includes a passage between the outer part and the duct segment and a valve configured to allow the fluid to pass from the outer part to the duct by Venturi effect.

The inventors have observed that the duct segment and the seal creation modules form a portion of the pipe which has a smaller diameter than that of the pipe. Thereupon, due to the movement of the fluid, a pressure reduction is observed due to the Venturi effect.

The diameter of the duct segment is smaller than that of the pipe, and its shape and its diameter can be selected to favor the Venturi effect. In particular, the duct segment can have a curved shape to form a restriction in which the fluid is accelerated, which leads to a pressure reduction.

To facilitate the passage of the fluid, the passage may be inclined in the wall of the duct segment relative to the axial direction of the duct segment.

For example, the passage forms an acute angle between the general direction of the fluid in the duct segment and the general direction of the fluid in the passage, when the valve is open to lower the pressure in the outer part.

For example, the passage is inclined toward the general direction of the fluid.

The tool therefore has a passage which is inclined in one direction, and it will be placed in the pipe depending on the direction of the inclination and the direction of flow of the fluid.

During the opening of the valve, the fluid included in the outer part is evacuated at least partially toward the duct segment because the pressure is less in the duct segment.

A simple system is thus obtained for implementing a decompression of the outer part.

According to a particular embodiment, the pressure reducing module includes a pump.

It is also possible to use a pump which will aspirate (at least partially) the fluid present in the outer part; possibly to eject it into the duct segment.

According to a particular embodiment, the pressure reducing module includes a reservoir equipped with a valve.

This particular embodiment is particularly well suited for pipes in which liquid circulates, which lowers the pressure in the outer part. The reservoir may be empty before the valve is open.

According to a particular embodiment, the tool comprises at least one first pressure sensor arranged to measure the pressure in the duct segment and at least one second pressure sensor arranged to measure the pressure in the outer part.

The tool can also be equipped with a module for communicating with the outside of the pipe.

For example, command or control signals of the different modules of the tool can be received by the module for communicating with the outside of the pipe.

This communication module can be used to transmit information obtained by the pressure sensors to determine when it is possible to intervene on the wall of the pipe.

According to a particular embodiment, the first and second seal creation modules are in two parts, defining seal airlocks between the two parts of said first or second seal creation modules.

According to a particular embodiment, the tool comprises a module for reducing the pressure in at least one of the seal airlocks, or a module for reducing the pressure in each seal airlock.

The pressure reducing modules of the seal airlocks are similar to the pressure reducing module in the outer part. In other words, they can use valves and passages (Venturi effect), pumps, or even reservoirs.

According to a particular embodiment, the tool comprises at least one additional pressure sensor arranged to measure the pressure in at least one of said airlocks (or in each airlock).

It can be noted that the tool can include guide means: a non-motorized roller, a guide disk, a guide runner.

According to one particular embodiment, the tool includes several additional duct segments connected together, said first and second seal creation modules being arranged on the same duct segment, and at least one other duct segment comprises an element of the tool selected from among:

a module for determining the location of the tool, a motorized roller, a braking module, an electrical energy storage module and/or a hydraulic energy storage module, an energy generating module, an adjustable propulsion module, a controller (comprising for example a processor), a module for determining the speed of the tool, a module for triggering braking, a module for triggering a fine adjustment of the position of the tool, a non-destructive testing module, a pressure sensor arranged to measure the pressure in the outer part, a communication module, a non-motorized roller (for guiding for example), a guide disk, a guide runner.

In this particular embodiment, the tool includes two, three or a number greater than three duct segments.

Each segment can be equipped with a guide module, for example one or more rollers, or one or more guide disks, or one or more guide runners.

To connect the duct segments together, any type of mechanical link hinged between the segments can be used. A ball joint system may be used to connect the duct segments.

In addition, the connection can be of the connectable/disconnectable type so that it is possible to select, before an intervention, which duct segments will be used, depending on the functional modules which are present on each duct segment and also depending on the parameters of the intervention. This particular embodiment allows obtaining a tool which will be adaptable to each application, with good modularity.

The connection between the duct segments can also be a connection that allows the transfer of electrical and/or hydraulic energy, or a connection that allows the transfer of electrical signals (typically control signals).

Each duct segment may include a different element selected from the list of elements presented above.

The disclosure also proposes an installation comprising a pipe and a tool as defined above.

According to a particular embodiment, the installation also comprises a plurality of electromagnets or magnets arranged at predefined locations.

This particular embodiment is particularly well suited for tools equipped with magnetic sensors.

The disclosure also proposes a method of using the tool as defined above, comprising an intervention on the wall of a pipe.

For example, the intervention can comprise among other things a welded chip repair, a resurfacing repair, welding of an element applied to the pipe, or the removal of a tap followed by a repair.

For example, the tap can be a tap carried out for fraudulent purposes.

BRIEF DESCRIPTION OF THE DRAWINGS

The presentation of the disclosure will now be continued in relation to the appended figures.

DETAILED DESCRIPTION

Different variants of the tool will now be described which allow implementing an intervention on a wall of a pipe.

Figure 1:
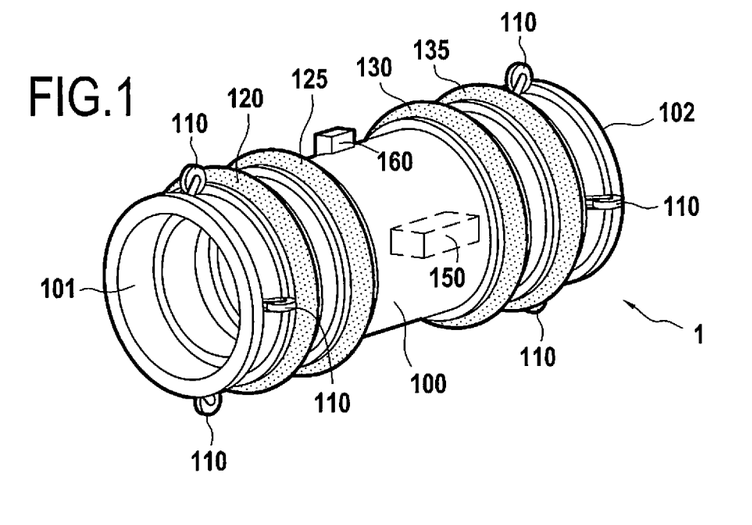
FIG. 1 shows a three-quarters view of the tool according to one embodiment of the disclosure.

FIG. 1 shows a tool 1 according to one embodiment of the disclosure, in three-quarters view. It is composed of a duct segment 100, which here is a rigid cylinder with a circular base, the orifices of which, 101 and 102, which are open, are planar in planes perpendicular to the axis of the cylinder and thus constitute circles.

Still in proximity to the orifice 101, on the outside of the duct segment, is present a first inflatable gasket 120. This inflatable gasket 120 is intended, when it is inflated, to be pressed against the inner wall of the pipe in which the tool circulates. Conversely, the gasket can be folded against the duct segment 100 when it is deflated. This inflatable gasket 120 consists of a body of revolution, have a circular or non-circular profile, for example a toroidal body having as its axis of revolution the axis of revolution of the duct segment, and surrounding the latter. This inflatable gasket 120 can be inflated by means of a hydraulic system, possible remotely controllable, comprising an oil/nitrogen accumulator. It is followed on the duct segment at a small distance when moving toward the second orifice 102, by a second inflatable gasket 125, similar to the first and also surrounding the duct segment 100. Still moving toward the second orifice 102, it is a third inflatable gasket 130 that is present, again similar to the two first ones. Finally, a fourth inflatable gasket 135 is present, approaching the second orifice 102. The distance between the third and fourth inflatable gaskets 130 and 135 is similar, even identical to that between the first and second inflatable gaskets 120 and 125 while the distance between the second and third inflatable gaskets 125 and 130 is greater.

The gaskets 120 and 125 form a first seal creation module, and the gaskets 130 and 135 form a second seal creation module.

Other seal creation modules can be used, such as gaskets expanding by compression or O rings or lip seals which can expand to be pressed against the inner wall of the pipe. Seals expanding by compression can comprise elastomeric element which can be expanded by an endless screw mechanism or a hydraulic system comprising flat or conical movable flanges and allow putting into compression the elastomeric elements. Instead of consisting essentially of a rigid cylinder, the duct segment can consist of two rigid cylinders connected by a bellows, to allow the tool to circulate in a pipe having curves, such as elbows.

The outside of the duct segment 100 carries, in proximity to the orifice 101, motorized rollers 110 which are positioned regularly on the circumference, for example in the same plane. In the example, they are shown four in number. Other motorized rollers 110 are present in proximity to the orifice 102.

Nevertheless, the disclosure is in no way limited to tools comprising only motorized rollers. It is also possible to use guide rollers which are not motorized but which improve the circulation of the tool, or even rollers equipped with brakes (which can also be guide rollers) and which are motorized or not. In addition, it is also possible to use roller for recovering energy (electrical or hydraulic) while rolling.

The motorized rollers 110 can be supplied for example by an electrical or hydraulic energy storage module. They can move the tool in the two opposite directions. Also, the rollers can be provided with a hinge, for example provided with a spring, which presses the motorized rollers against the wall of the pipe in which the tool is placed.

A module for motorizing at least one if said rollers 110 may be able to function as an energy generator. The generation of energy may be a generation of electrical energy for recovering electric energy by braking the tool during its movement in the pipe, and transferring this electrical energy into an electrical energy storage module (typically a battery).

The use of motorized rollers allows fine movement of the tool, for example on the order of a centimeter. Motorized rollers may thus be used in proximity to an intervention point of the pipe. A person skilled in the art will know how to select motorized rollers suitable for the application.

To obtain an even more autonomous operation, the tool 1 is equipped with a module 150 for determining the location of the tool in the pipe.

Thus, with the motorized rollers and the module for determining the location of the tool in the pipe, the tool can move toward a selected location: the intervention point.

In addition, the tool is equipped with a module 160 for reducing the pressure of the fluid present in the outer part. This outer part is that which will be located between the two seal creation modules, the duct segment, and the wall of the pipe. It has a substantially annular shape, and to be able to intervene on the wall of the pipe it is necessary to reduce the pressure of the fluid in this part.

By using the module 160 directly within the tool, the implementation of a tap intended to reduce the pressure of the fluid located in the outer part, to then intervene on the wall, is made unnecessary.

Figure 2:
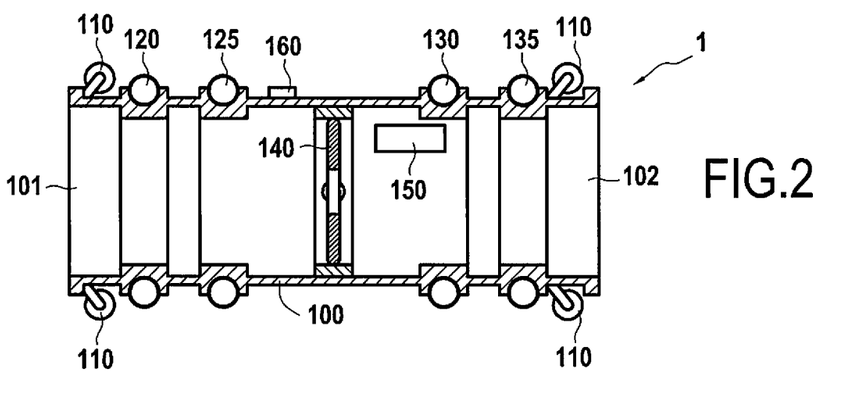
FIG. 2 shows a longitudinal section of the tool of FIG. 1.

Found in FIG. 2 are the elements presented in relation with FIG. 1, in a section view passing through the axis of revolution of the tool 1. It can be seen that the four inflatable gaskets are installed in grooves provided for this purpose on the surface of the duct segment 100. It is also seen that the motorized rollers 110, whether they are in proximity to the orifice 101 or to the orifice 102, are all configured in the same direction, to facilitate the circulation of the tool in a pipe in a particular direction. As explained above, the rollers (all rollers can equip the tool, motorized or not) can have a radial clearance (for example using a spring) to guarantee good guidance despite geometric variations encountered in the pipes (manufacturing tolerances of the tubes, welds, hangers, local deformations . . . ). It is also specified that in the embodiment presented, the motorized rollers 110 are between the corresponding orifice (resp. 101, 102) and the closest of the inflatable gaskets (resp. 120, 135), but the motorized rollers could be positioned elsewhere on the tool.

Moreover, the tool comprises an adjustable propulsion module which consists here of an adjustable flap 140 placed halfway between the two orifices 101 and 102 inside the duct segment 100. This flap 140 is visible in FIG. 2 in its closed position, which allows maximum entrainment of the tool by the fluid, and in its open position in FIG. 3, which maximally entrainment and facilitates the stopping of the tool (or its braking at least). The flap 140 is motorized, to pass from one to the other of the two positions or to adopt an intermediate position, and to retain the adopted position during the movement of the tool in the flow. It therefore provides variable "windage" depending on its degree of opening. The flap 140 therefore allows the tool 1 to move within the pipe, with the fluid, in the same direction as the latter, by using the movement of the fluid to take advantage of an entrainment phenomenon. The tool 1 also comprises a motorization system for the flap 140, or the flaps if several flaps are used. The flap 140 can receive electrical or hydraulic energy from an energy storage module which can also supply the motorized rollers with energy. Alternatively, the propulsion module can include, instead of the flap(s), one or more diaphragms, or even one or more adjustable grids.

It can be noted that the tool can comprise an energy generating module including a propeller, or a turbine, or a roller, the module being able to recover hydraulic or electrical energy, for example to store it in the electrical or hydraulic energy storage module.

Figure 3:
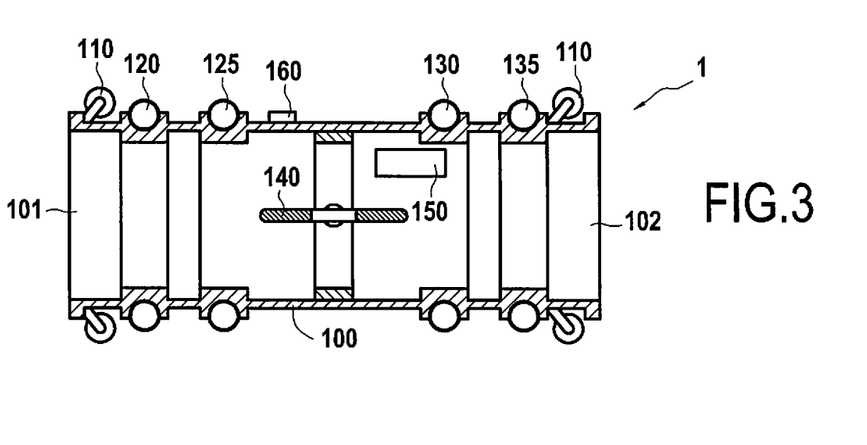
FIG. 3 shows the same section, the propulsion flap being open.

It can be noted that if a flap 140 is used (or a grid or a diaphragm), then the motorized rollers can be in a freewheel state when the flap is closed and the tool is propelled by entrainment by the fluid.

Figure 4:
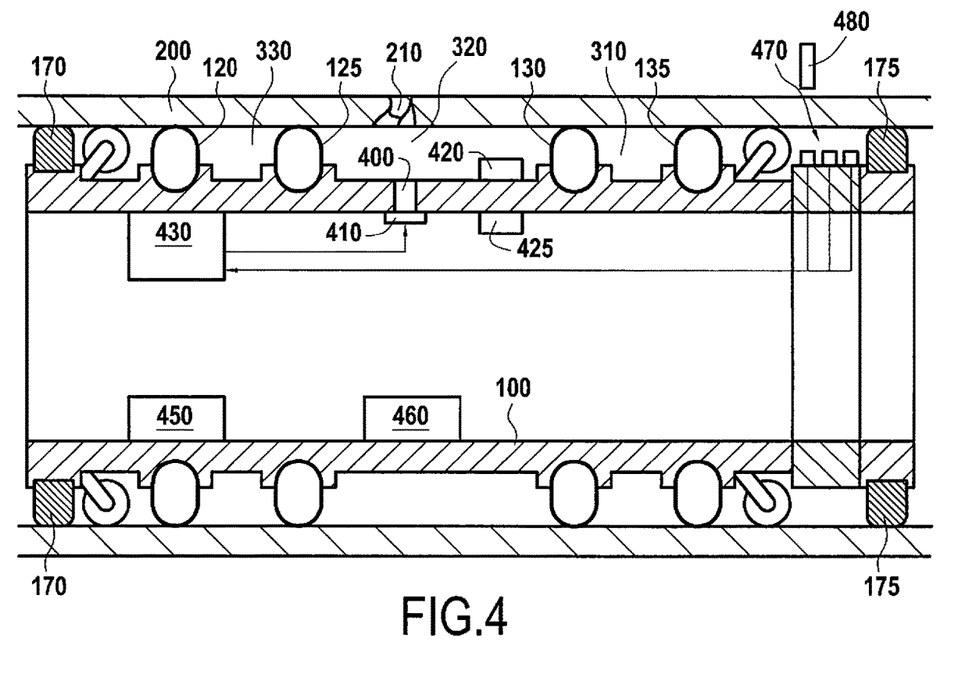
FIG. 4 shows an example of a tool equipped with a module using the Venturi effect.

In FIG. 4, the tool 1 is shown moving in a fluid transport pipe 200. The fluid can be a liquid or a gas. The pipe can be buried, in the open, or running under the sea or under a lake.

The tool has been previously introduced by a launching station (not shown), which is a pipe facility which conventionally allows introducing cleaning or inspection tools into the pipe. Before the tool was introduced, it has been verified that the pipe 200 was trackable, i.e. that an object of this kind can circulate inside without remaining blocked there. The tool 1 has an outer diameter which allows it to circulate in the pipe 200, the motorized rollers 110 being in contact for guidance with the inner surface of the wall of the pipe 200. The tool is driven by the fluid current flowing in the pipe, at a speed which depends on the level of opening of the flap 140 (not shown in this figure) and the flow rate of the fluid. The fluid flows essentially inside the duct segment 100 if the flap is open.

The tool is shown in the figure placed so as to allow an intervention on the intervention point 210 of the pipe 200, which has a fault here. Also shown is the inflation of the inflatable gaskets 120, 125, 130 and 135 of the tool 1. Each of these elements enters into contact with the wall of the pipe to prevent the passage of fluid around the duct segment 100. Thus three toroidal sealed zones 310, 320 and 330 are created. The fluid continues to circulate inside the duct segment 100.

The tool is also equipped with a braking module which comprises a seal 170 and a seal 175 on which a pressure application module presses the seals against the wall of the pipe (the disclosure is in no way limited to the presence of two seals, a single seal being usable). During the intervention, the seals are pressed against the wall of the pipe to prevent the tool from moving.

The seals 170 and 175 can be more robust than the seals 120, 125, 130 and 135, for example rubber with a denser outer surface (to be more resistant to abrasion).

To be able to implement the intervention, it is necessary first of all to reduce the pressure in the outer part 320. This outer part 320 is surrounded by the wall of the pipe 200, the seals 125 and 130, and the duct segment 100.

The module for reducing the pressure of the fluid present in an outer part comprises, in this example, a passage 400 and a valve 410 to allow the fluid to pass from the outer part to the duct segment by Venturi effect. In fact, the pressure in the duct segment 100 is lower than in the rest of the pipe, due to the circulation of the fluid and the reduced cross section at the tool. By controlling the valve 410 into a passing state, the fluid is transferred from the outer part to the passage formed by the duct segment.

To monitor the passage of the fluid, a pressure sensor 420 is used, which measures the pressure in the outer part, and a pressure sensor 425 which measures the pressure in a passage defined by the duct segment 100.

To control the valve 410 and to process the information originating in the sensors 420 and 425, the tool is equipped with a controller 430. For example, the controller 430 can include a microcontroller of the processor type.

The tool also comprises a battery 450 forming an electrical energy storage module, which can supply electrical energy to all the elements of the tool. Finally, the tool comprises a non-destructive testing module 460. For example, an X-ray testing module can equip the tool.

The determination module of the tool comprises, in this example, a magnetic sensor 470 (possibly comprising one or more windings). This sensor is intended to be aligned with an electromagnet 480 that is to be placed outside the pipe. The electromagnet 480 can transmit a signal with its own signature, which is useful if several electromagnets are arranged outside the pipe.

Figure 5:
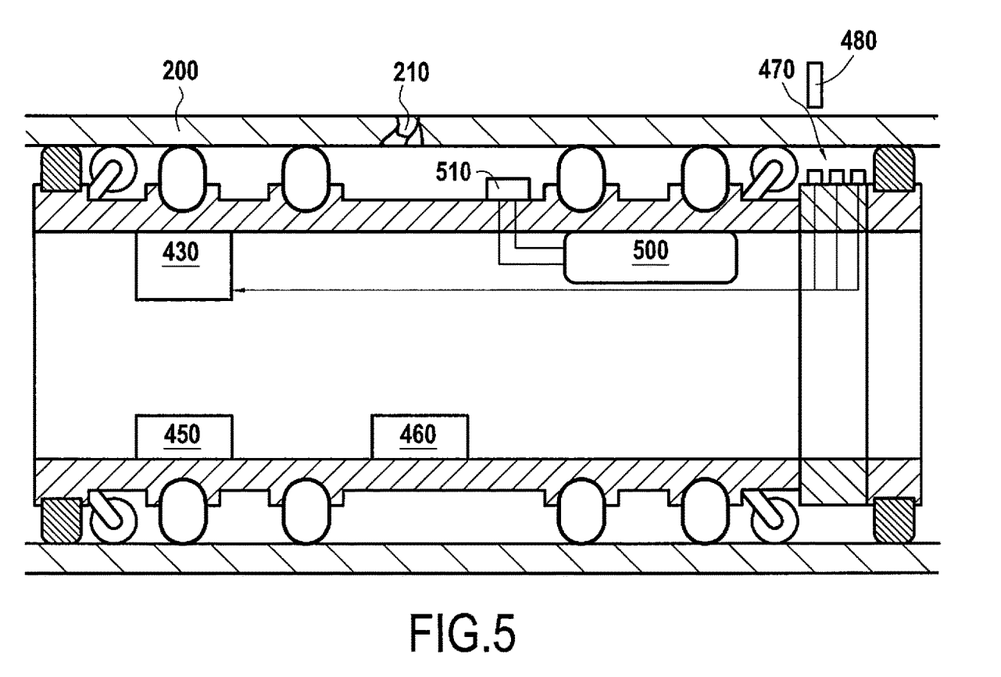
FIG. 5 shows an example of a tool equipped with a reservoir.

In FIG. 5 is shown a variant of the tool in which a reservoir 500 is mounted on the tool, with a valve 510 intended to be open to empty the outer part 320 at least partially. Initially, the reservoir can be empty.

It will be noted that the modules for reducing the pressure of the fluid can also be used to empty the parts 310 and 330.

Figure 6A:
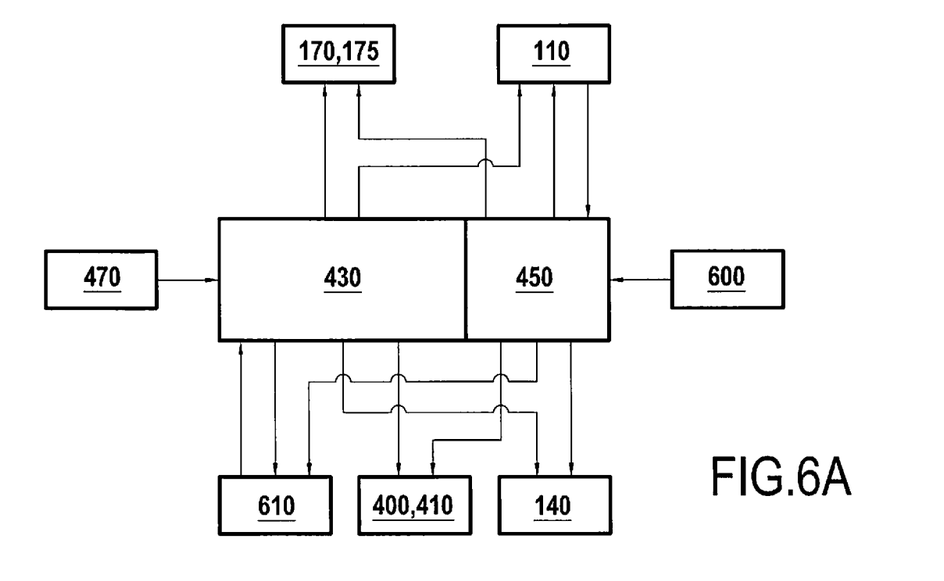
FIGS. 6A and 6B illustrate schematically examples of control architecture of the tool.

In FIG. 6A is shown schematically an example of control architecture of the tool. In this example, the tool uses the electrical energy supplied by the battery 450 described with reference to FIG. 4. The battery 450 supplies with electrical energy the braking modules 170, 175, the motorized rollers 110, the adjustable flap 140, the Venturi effect pressure reducing module and more precisely the valve 410, and module for communicating with the outside 610.

The module for communicating with the outside is capable of receiving information, and in particular location information of the geolocation type. With this module, the tool is controllable from the outside of the pipe. The battery 450 receives energy from the motorized rollers 110 and from a propeller or turbine 600.

To control the different elements of the tool, a controller 430 of the tool transmits control signals and can receive information from the module for communicating with the outside 610 or from the magnetic sensor 470. It is understood that the controller 430 can manage quasi-autonomously the operation of the tool. The controller itself can include a non-volatile memory in which are stored the instructions for controlling the tool, these instructions being able to be executed by a processor of the controller.

Figure 6B:
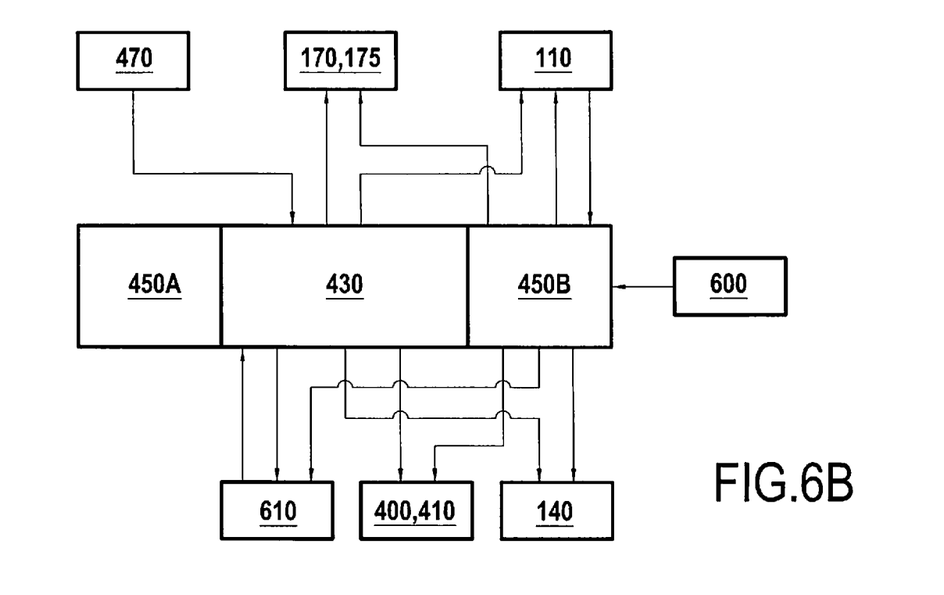

In FIG. 6B is shown an alternative embodiment in which only the processor is supplied by a battery 650A. The other modules are received or supply hydraulic energy by means of a hydraulic energy storage module, for example a reservoir under pressure (which can comprise gas and fluid, typically oil and gas).

A person skilled in the art will know how to adapt the different modules for operation based on hydraulic energy.

Figure 7A:
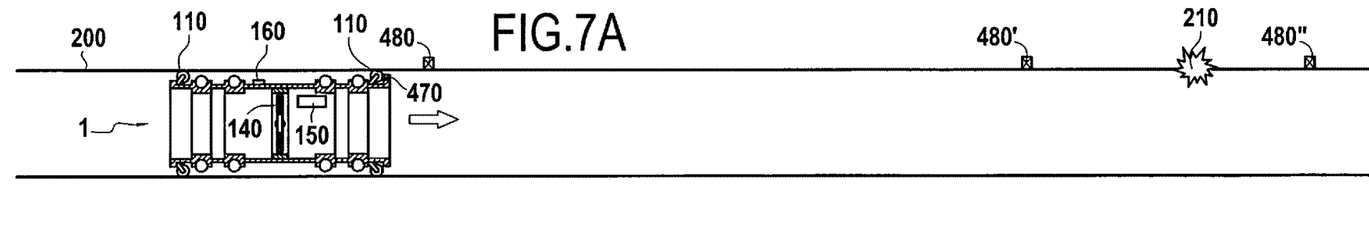
FIGS. 7A, 7B, 7C, and 7D illustrate the movement of the tool in a pipe until an intervention point.

In FIG. 7A is shown the movement of the tool 1 moving in the pipe 200. At this stage, the flap 140 is closed so that the tool advances by entrainment due to the fluid that circulates. The tool moves toward an intervention point 210 having a fault to be repaired. The speed of the tool can be known from information received, or on the basis of the detection of magnetic signals.

Figure 7B:
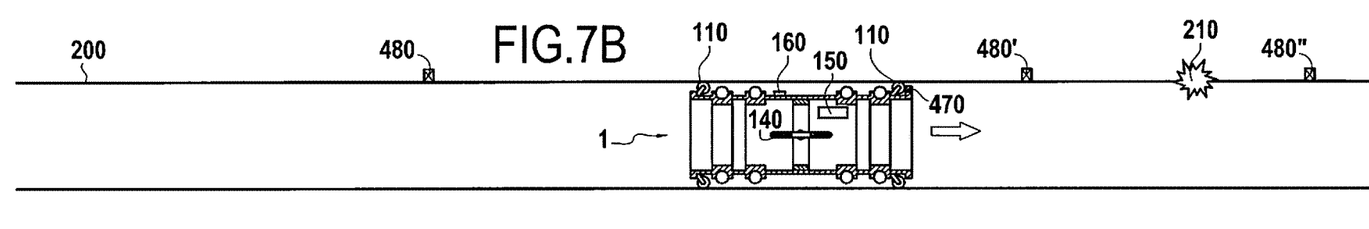

In fact, to trigger a braking phase, an electromagnet 480 has been arranged at a predefined distance from the point 210 (for example several hundred meters). The detection of the signal emitted by this electromagnet, which can have a signature of its own, by the magnetic sensor 470, will trigger the opening of the flap 140, as illustrated in FIG. 7B. The tool then continues its movement until it detects the signature of a signal transmitted by the electromagnet 480', which can trigger the use of the motorized rollers 110, either to brake the tool (or implement braking by energy recovery), or to guide the tool to the intervention point 410.

Figure 7C:
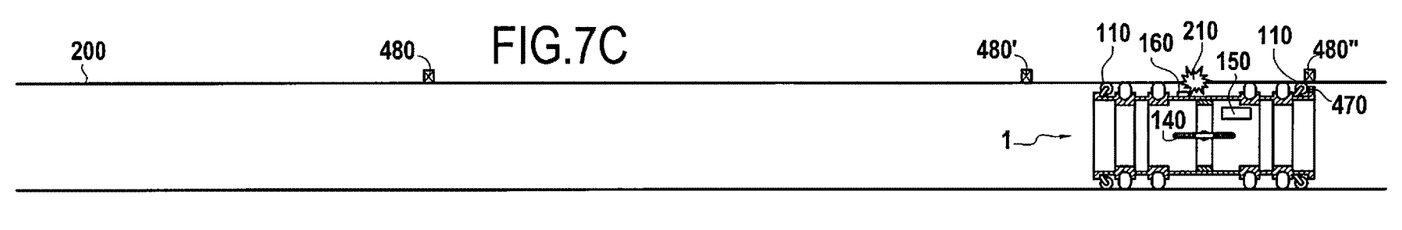

In FIG. 7C is shown the tool after arrival at the intervention point, with positioning provided by the detection of the signal or of the signature of the signal transmitted by the electromagnet 480". It is then possible to implement a repair of the wall.

Figure 7D:
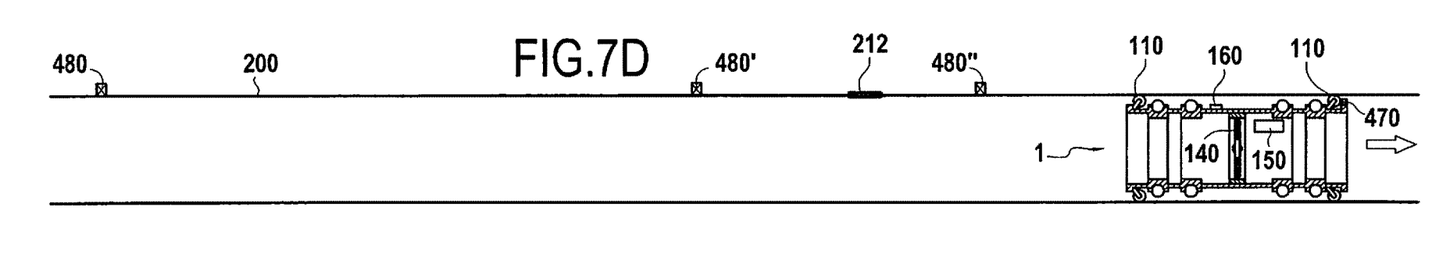

In FIG. 7D is shown the repair 212 carried out at the intervention point, and the movement of the tool to reach either another point to be repaired or to reach a launching station. The flap is then in the closed position.

It will be noted that the tool of FIG. 7 can also use the braking seals 170 and 175 described with reference to FIG. 5.

Figure 8:
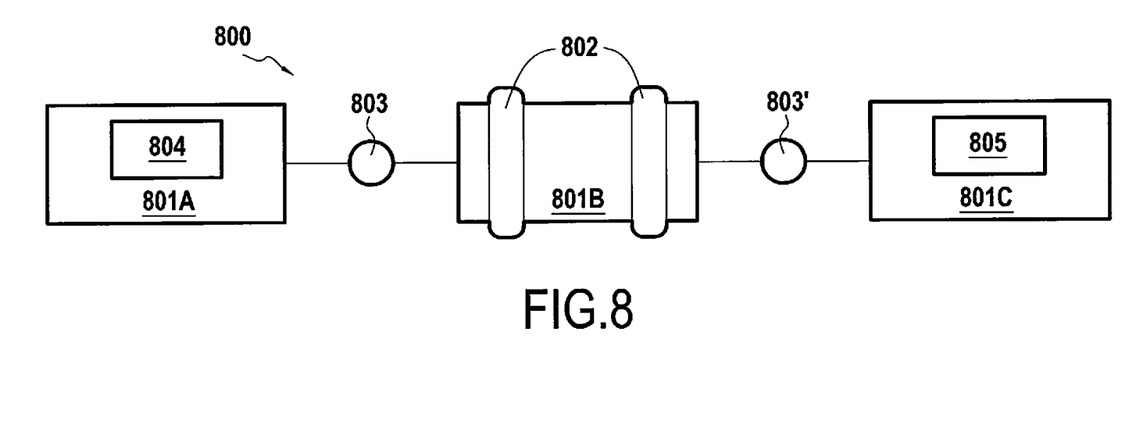
FIG. 8 shows a tool with several duct segments.

In FIG. 8 is shown a tool 800 which includes three duct segments 801A, 801B, and 801C. The disclosure, however, is in no way limited to tools comprising three duct segments. Additional duct segments can be used.

The duct segment 801B is equipped with first and second seal creation modules 802. It is preferable that these seal creation modules be placed on the same duct segment to obtain a simpler tool. In addition, the pressure reducing module (not shown) is on this duct segment 801B.

The duct segments are connected together by ball joint connections 803 which allow the tool to pass through elbows of the pipes.

The duct segment 801A includes an element 804, here a module for determining the location of the tool, and the duct segment 801C includes an element 805, here one of the motorized rollers.

In fact, the tool can comprise other duct segments on which at least one element will be placed selected from:

a motorized roller, a braking module an electrical energy storage module and/or a hydraulic energy storage module, an energy generating module, an adjustable propulsion module, a controller, a module for determining the speed of the tool, a module for triggering braking, a module for triggering a fine adjustment of the position of the tool, a non-destructive testing module, a pressure sensor arranged to measure the pressure in the outer part, a communication module, a non-motorized roller (for guiding for example), a guide disk, a guide runner . . . .

Figure 9:
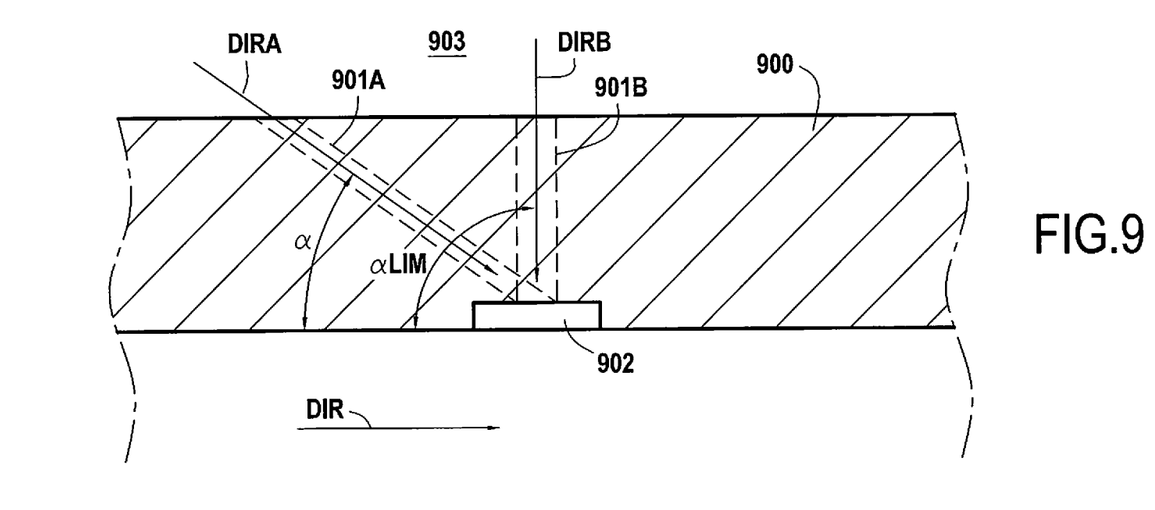
FIG. 9 illustrates in a more detailed manner a passage using the Venturi effect to reduce the pressure in the device.

In FIG. 9 is shown a wall of a duct segment equipped with a passage 901A or 901B and with a valve 902. The passage and the valve form a module for reducing pressure in the outer part 903 of the pipe in which the tool is placed.

In the duct segment, the fluid flows in the general direction DIR.

The two passages 901A and 901B illustrate two examples of possible positions for the passage, to obtain a reduction in the pressure by Venturi effect.

The passage 901A forms an acute angle α between the general direction of the fluid in the duct segment DIR and the general direction of the fluid in the passage DIRA when the valve is open to lower the pressure in the outer portion 903.

In fact, the passage is inclined toward the fluid direction DIR.

The position 901B is the limit position with an angle αLIM which is equal to 90° between the general direction of the fluid in the duct segment DIR and the general direction of the fluid in the passage DIRB when the van is open to reduce the pressure in the outer part 903.

The embodiment of FIG. 9 favors the passage of the fluid from the outer part to the interior of the duct segment.

The different embodiment presented above allow obtaining an intervention on the wall of a pipe or a more rapid repair of the wall of this pipe, with simplified guidance of the tool.

The invention claimed is:

1. A tool for intervention on a wall of a fluid pipe, the tool comprising:
a duct segment through which the fluid is intended to flow when the tool is in the pipe, and
at least first and second modules configured to create seals between the wall of the pipe and the duct segment and to isolate the fluid circulating in an outer part of a section of the pipe between the first and second modules;
wherein the tool includes motorized rollers configured to move the tool in the pipe and a module configured to determine a location of the tool in the pipe;
wherein the module configured to determine the location comprises a sub-module configured to receive at least one remote signal;
wherein the sub-module configured to receive at least one remote signal includes a magnetic sensor;
wherein the tool further comprises a module configured to determine a speed of the tool based on a detection of at least two magnetic signals by the magnetic sensor.

2. The tool according to claim 1, wherein the motorized rollers are configured to move the tool in the pipe in two opposite directions.

3. The tool according to claim 1, comprising at least one of an electrical energy storage module and a hydraulic energy storage module.

4. The tool according to claim 3, including at least one of an energy generating module comprising a propeller, a turbine, and a roller, the module capable of generating hydraulic or electrical energy to be stored in at least one of said electrical energy storage module and the hydraulic energy storage module.

5. The tool according to claim 1, comprising at least one braking module including at least one seal, or at least one runner, and a module configured to apply a pressure capable of pressing the seal or the runner against the wall of the pipe.

6. The tool according to claim 5, wherein the braking module comprises two seals or two runners.

7. The tool according to claim 5, wherein the braking module comprises a module configured to motorize at least one of said motorized rollers capable of functioning as an energy generator for recovering energy by braking the tool during movement in the pipe.

8. The tool according to claim 5, wherein the braking module comprises at least one brake of a roller equipping the tool.

9. The tool according to claim 1, comprising a module configured to trigger braking of the tool on the basis of a detection of a magnetic signal by the magnetic sensor.

10. The tool according to claim 1, comprising a module configured to trigger a fine adjustment of a position of the tool on the basis of a detection of a magnetic signal by the magnetic sensor.

11. The tool according to claim 1 wherein the sub-module configured to receive at least one remote signal comprises a module configured to receive geolocation information.

12. The tool according to claim 1, wherein the module configured to determine the location comprises an odometer.

13. The tool according to claim 1, wherein the module configured to determine the location comprises an inertial unit.

14. The tool according to claim 1, comprising a non-destructive testing module.

15. The tool according to claim 1, including several additional duct segments connected together, said first and second modules being arranged on the same duct segment, and at least one other duct segment comprises an element of the tool selected from: a module configured to determine the location of the tool, a motorized roller, a braking module, at least one of an electrical energy storage module and a hydraulic energy storage module, an energy generating module, an adjustable propulsion module, a controller, a module configured to determine the speed of the tool, a module configured to trigger braking, a module configured to trigger a fine adjustment of a position of the tool, a non-destructive testing module, a pressure sensor arranged to measure the pressure in the outer part, a communication module, a non-motorized roller, a guide disk, a guide runner.

16. An installation comprising a pipe and the tool according to claim 1.

17. The installation according to claim 16, also comprising a plurality of electromagnets or magnets arranged at predefined positions.

18. A method of using the tool according to claim 1, comprising an intervention on the wall of a pipe.

* * * * *